United States Patent
Allard et al.

(10) Patent No.: US 9,996,852 B2
(45) Date of Patent: *Jun. 12, 2018

(54) SYSTEM AND METHOD FOR MEASURING AND IMPROVING THE EFFICIENCY OF SOCIAL MEDIA CAMPAIGNS

(71) Applicant: Engagement Labs Inc./Laboratoires Engagement Inc., Montreal (CA)

(72) Inventors: Paul Allard, Montreal (CA); Tom Liacas, Montreal (CA); Cédric de Saint Léger, Paris (FR)

(73) Assignee: ENGAGEMENT LABS INC./LABORATOIRES ENGAGEMENT INC., Montreal, QC (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/091,888

(22) Filed: Apr. 6, 2016

(65) Prior Publication Data

US 2016/0217489 A1    Jul. 28, 2016

Related U.S. Application Data

(63) Continuation-in-part of application No. 14/722,361, filed on May 27, 2015, which is a continuation of (Continued)

(51) Int. Cl.
*G06F 15/16* (2006.01)
*G06Q 30/02* (2012.01)
(Continued)

(52) U.S. Cl.
CPC ..... *G06Q 30/0246* (2013.01); *G06F 17/3053* (2013.01); *G06Q 30/0202* (2013.01); *G06Q 50/01* (2013.01)

(58) Field of Classification Search
CPC ........ H04L 51/32; H04L 12/588; G06Q 50/01
(Continued)

(56) References Cited

U.S. PATENT DOCUMENTS 7,401,039 B1    7/2008  Lin et al.
7,933,843 B1    4/2011  Von Groll et al.
(Continued)

FOREIGN PATENT DOCUMENTS

CN    101853261 A    10/2010
WO    2010116371 A1    10/2010
WO    2011146776 A1    11/2011

OTHER PUBLICATIONS

Parta Dialogue Inc. et al, International Patent Application No. PCT/CA2012/000665, International Search Report, dated Oct. 15, 2012.
(Continued)

*Primary Examiner* — Andrew Woo
(74) *Attorney, Agent, or Firm* — Michael G. Johnston; Moore & Van Allen PLLC

(57) ABSTRACT

A system and method for measuring the efficiency of social media campaigns. The system collects searchable activity data of members of a social network and processes this data locally to extract interaction data happening on the profile page of the social media campaign on the social network. The interaction data is then weighed in accordance with its type. The system may also determine a reach of the campaign and a responsiveness score of a user. The system may also determine an effort score representing a monetary value of the profile page based on the volume of contribution by the owners of the social media campaign. The efficiency score may then be determined based on a relationship
(Continued)

between the number of interactions, the weight associated with each interaction, the reach, the responsiveness score, and the effort score.

10 Claims, 6 Drawing Sheets

Related U.S. Application Data application No. 13/545,079, filed on Jul. 10, 2012, now Pat. No. 9,070,140.

(60) Provisional application No. 61/578,470, filed on Dec. 21, 2011.

(51) Int. Cl.
    *G06F 17/30*     (2006.01)
    *G06Q 50/00*     (2012.01)

(58) Field of Classification Search
    USPC .......................................................... 709/204
    See application file for complete search history.

(56) References Cited

U.S. PATENT DOCUMENTS

| | | | |
|---|---|---|---|
| 2007/0121843 A1* | 5/2007 | Atazky | H04L 51/32 379/114.13 |
| 2007/0294281 A1 | 12/2007 | Ward et al. | |
| 2010/0023300 A1 | 1/2010 | Farry et al. | |
| 2010/0198757 A1* | 8/2010 | Cheng | G06Q 10/06 706/12 |
| 2010/0218128 A1 | 8/2010 | Bonat et al. | |
| 2011/0054991 A1 | 3/2011 | Orellana et al. | |
| 2011/0072052 A1 | 3/2011 | Skarin et al. | |
| 2011/0087534 A1 | 4/2011 | Strebinger et al. | |
| 2011/0264496 A1 | 10/2011 | Engstrom et al. | |
| 2011/0276504 A1 | 11/2011 | Pradeep et al. | |
| 2012/0036018 A1 | 2/2012 | Feliciano et al. | |
| 2012/0158477 A1 | 6/2012 | Tennenholtz et al. | |
| 2012/0158518 A1 | 6/2012 | Benyamin et al. | |
| 2012/0191543 A1 | 7/2012 | Dharmaji | |

OTHER PUBLICATIONS

Engagement Labs Inc., European Patent Application No. 12860108. 5, Extended European Search Report, dated Jun. 26, 2015.
U.S. Appl. No. 13/545,079, Office Action, dated Apr. 14, 2014.

* cited by examiner

SYSTEM AND METHOD FOR MEASURING AND IMPROVING THE EFFICIENCY OF SOCIAL MEDIA CAMPAIGNS

CROSS REFERENCE TO RELATED APPLICATIONS

This application is a Continuation-in-Part of U.S. application Ser. No. 14/722,361, which is a continuation from U.S. application Ser. No. 13/545,079 which claims priority from U.S. Provisional Application No. 61/578,470 filed on Jul. 10, 2012 which is incorporated herein by reference in its entirety.

BACKGROUND (a) Field

The subject matter disclosed generally relates to a method and system for measuring the efficiency of social media campaigns.

(b) Related Prior Art

There is a need for a system and method which determine the efficiency of social media campaigns and recommend actions to improve the efficiency of these campaigns.

SUMMARY

In an aspect there is provided a computer-implemented method for measuring an efficiency of a social media campaign (campaign) presented on a profile page on a social network, comprising: collecting searchable activity data which is publicly available on profile pages associated with members of the social network, from a remote server of the social network using a communication network; extracting, from the activity data, interaction data representing audience feedback on the campaign; assigning a weight to each interaction based on a type of the interaction; estimating an amount of money spent in developing the campaign based on the profile page of the campaign; and determining an efficiency score of the campaign as a ratio between the amount of money and a number calculated based on the amount of interactions and the weight associated with each interaction.

In an embodiment the method may further comprise determining an efficiency score for the campaign on more than one social network; assigning a weight to each social network; and determining a global efficiency score for the campaign, the global efficiency score representing an overall efficiency of the campaign using the efficiency score and the weight associated with each social network.

In a further embodiment, the method may further comprise determining, using the activity data of all members, an efficiency score for all members in an industry to which the social campaign belongs; determining an industry efficiency score by averaging the efficiency scores of all members of the industry; presenting the industry efficiency score concurrently with the campaign efficiency score on a display for viewing.

In an embodiment, upon detecting that the campaign efficiency score is below a predetermined threshold, the method may comprise: collecting ranking rules of the social network from the remote server of the social network using the communication network; mapping the ranking rules to the activity data; in view of the mapping, generating one or more recommendations for improving a campaign's visibility and/or efficiency score on the social network.

The method may also comprise collecting ranking rules of the social network from the remote server of the social network using the communication network; analyzing the activity data in view of the ranking rules; in view of the analyzing, generating one or more recommendations for improving a campaign's visibility and/or efficiency score on the social network.

In an embodiment, the analyzing may comprise mapping the ranking rules to the activity data.

The method may further comprise re-ordering the ranking rules in view of the weight assigned to each rule, whereby the activity data is analyzed in view of the most relevant rule first.

The method may further comprise performing the steps of extracting, assigning, estimating, determining and presenting in real time, in response to receiving a member request of campaign efficiency score.

In an embodiment the method may comprise performing the steps of extracting, assigning, estimating, determining and presenting in real time, in response to receiving a member request of campaign efficiency score.

In a further embodiment the method may also comprise measuring of the efficiency is provided as a Software as a Service (SaaS) to a remote member using a communication network.

The interaction data may comprise actions performed by other members on the profile page, said actions comprising at least one of: viewing, liking, disliking, commenting, and sharing content of the social campaign.

The activity data may include any one of: viewing, liking, disliking, commenting, sharing, posting new materials, updating profile, commenting on content outside of the social campaign profile page.

In an embodiment, the relationship is a ratio between the effort score and the sum of each interaction multiplied by its weight.

In another aspect, there is provided a system for measuring an efficiency of a social media campaign (campaign) presented on a profile page on a social network, comprising: an input adapted to collect searchable activity data which is publicly available on profile pages of members of the social network, from a remote server of the social network using a communication network; a memory for storing the collected activity data for processing; an intelligence module comprising a processor having access to computer readable instructions which when executed by the processor cause the processor to: extract, from the activity data, interaction data representing audience feedback on the campaign; assign a weight to each interaction based on a type of the interaction; estimate an amount of money spent in developing the campaign based on the profile page of the campaign; determine an efficiency score of the campaign as a ratio between the amount of money and a number calculated based on the amount of interactions and the weight associated with each interaction; and an output adapted to send the efficiency score to a remote user for displaying on a display device.

The intelligence module may be adapted to
 determine an efficiency score for the campaign on more than one social network;
 assign a weight to each social network; and
 determine a global efficiency score for the campaign, the global efficiency score representing an overall efficiency of the campaign using the efficiency score and the weight associated with each social network.

The intelligence module may also be adapted to:
collect ranking rules of the social network from the remote server of the social network using the communication network;
analyze the activity data in view of the ranking rules;
generate, in view of the analysis, one or more recommendations for improving a campaign's visibility and/or efficiency score on the social network.

In a further aspect, there is provided a A computer-implemented method for measuring an efficiency of a social media campaign (campaign) presented on a profile page on a social network, comprising: collecting searchable activity data of members having profile pages on the social network from a remote server of the social network using a communication network; extracting, from the activity data, interaction data representing actions performed by other members on the profile page, the profile page of the campaign being one of the profile pages on the social network, the actions comprising at least one of: viewing, liking, disliking, commenting, and sharing content of the social campaign; assigning a different weight to each different interaction based on a type of the interaction; estimating an effort score for the campaign, the effort score representing a monetary value spent in developing the campaign; determining an efficiency score of the campaign as a ratio between the amount of money and a number calculated based on the amount of interactions and the weight associated with each interaction; collecting ranking rules of the social network from the remote server of the social network using the communication network; mapping the ranking rules to the activity data; in view of the mapping, generating one or more recommendations for improving a campaign's visibility and/or efficiency score on the social network; and sending the efficiency score of the campaign and the recommendations to a remote computing device.

In the following description a user/member may be interpreted as an individual or an entity that includes more than one person such as a company, firm or the like.

Furthermore, a social media campaign may include a wide range of campaigns ranging from personal profiles to commercial advertising campaign, to campaigns intended to raise awareness etc.

The ranking rules are rules that are set by the administration of the social networks to determine the visibility of the profile pages of the members on the social network. These rules differ between a website and the other and are changed periodically.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The present document describes a system and a method for measuring the efficiency of social media campaigns. The system collects searchable activity data of members of a social network and processes this data locally to extract interaction data happening on the profile page of the social media campaign on the social network. The interaction data is then weighed in accordance with its type. The system may also determine an effort score representing a monetary value of the profile page based on the volume of contribution by the owners of the social media campaign. The efficiency score may then be determined based on a relationship between the number of interactions, the weight associated with each interaction, and the effort score.

Figure 1:
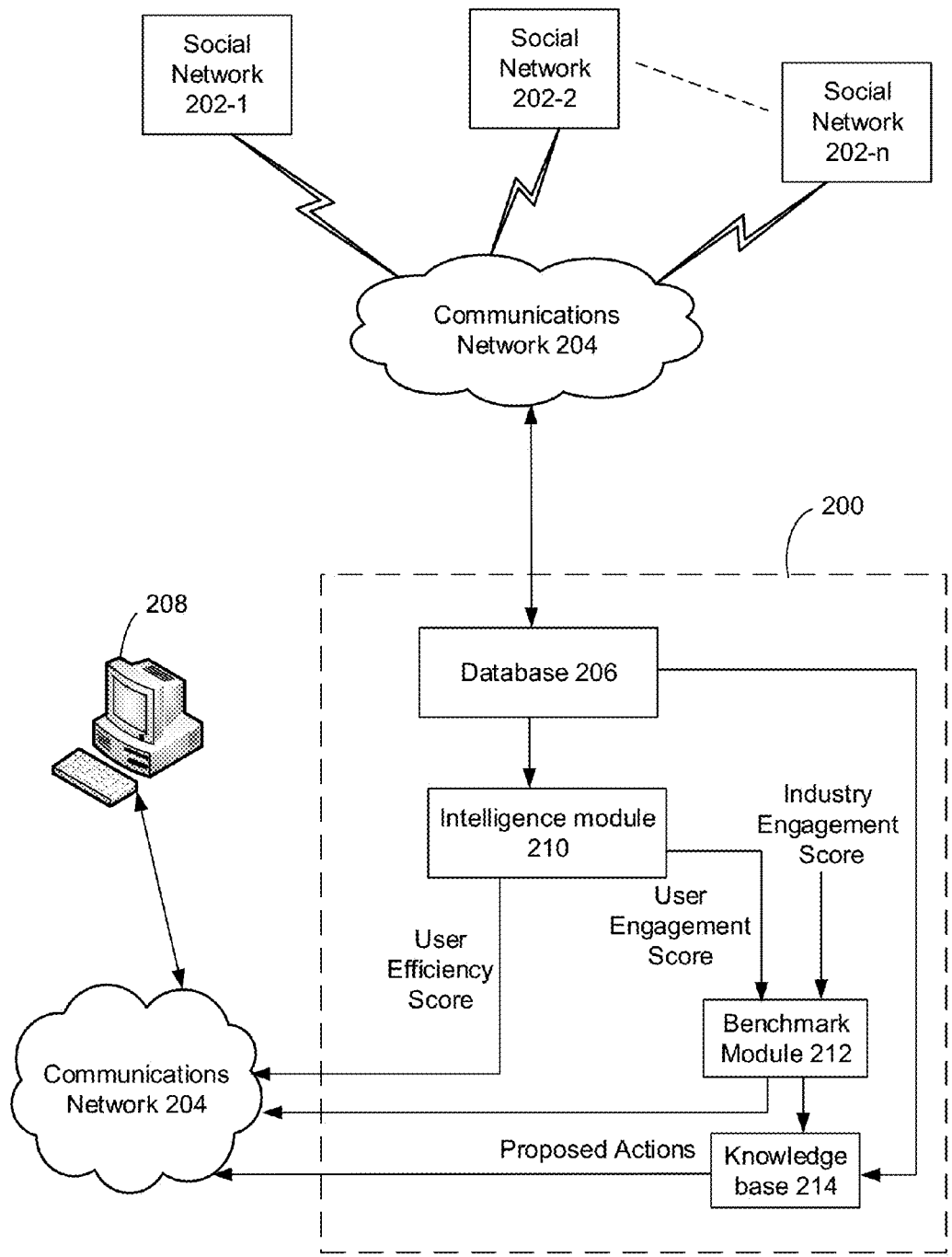
FIG. 1 is a block diagram of an exemplary system for measuring and improving the efficiency of social media campaigns, in accordance with an embodiment.

FIG. 1 is a block diagram of an exemplary system for measuring and improving the efficiency of social media campaigns, in accordance with an embodiment. The system may be accessed remotely over a communication network by a plurality of clients. The measuring and improving of the efficiency of social media campaigns may be offered as a Software as a Service (SaaS) in a cloud computing environment. An exemplary SaaS Environment is described hereinbelow.

As shown in FIG. 1, a system 200 collects public activity data (statistical profile data that is publicly available) of members of one or more social media networks 202 over a communication network 204 such as the internet, or any other type of wired and/or wireless communication networks. Examples of social media networks include but are not limited to: Facebook, LinkedIn, Google+, Twitter, Foursquare, Instagram, Pinterest, etc.

The system collects (scrapes) the public activity data from the remote servers of the social networks 202, processes the data locally and then provides the results to the user 208 over the communication network 204. In an embodiment, the user 208 has to open an account and create a user profile with the system 200. The user may link their profile with the system 200 to one or more accounts at one or more social media network 202.

The public activity data may be obtained/updated in real time or regularly, for example, every few hours, daily, or weekly. The data collected from the different social networks 202 may be stored in a database 206 to be processed by an intelligence module 210. Using a proprietary algorithm, the intelligence module 210 processes the collected activity data to determine an individual user engagement score for the user with each social media network.

In a non-limiting example of implementation, the algorithm causes the system 200 to count interactions that happened between the user and his community on the campaign page/account. In an embodiment, each interaction count is given a weight that reflects how well the social media campaign has been received by the community (other users). For example: on Facebook, a "comment" is given more weight than a "like". In this case, pressing "like" is an indication that the users saw the message or the post or the article etc. on the other hand, if users make the effort to write a comment on the campaign page it means that the message of the campaign was thoroughly received by the users, or that the user is interested about the subject being advertised/posted.

It is to be noted that, in the present context, the activity data of the member includes all activities performed by the member and their connections on the member's profile page. By contrast, interaction data represents audience feedback e.g. actions that reflect feedback of other users on what the members have posted on their profile page and the response to the feedback. For instance, if the member writes an article and posts this article on their page, the article is considered an activity data, but not an interaction data. However, if one of the members of the audience presses "like" or "dislike" or writes a comment on the article, this would classify as interaction data.

Figure 6:
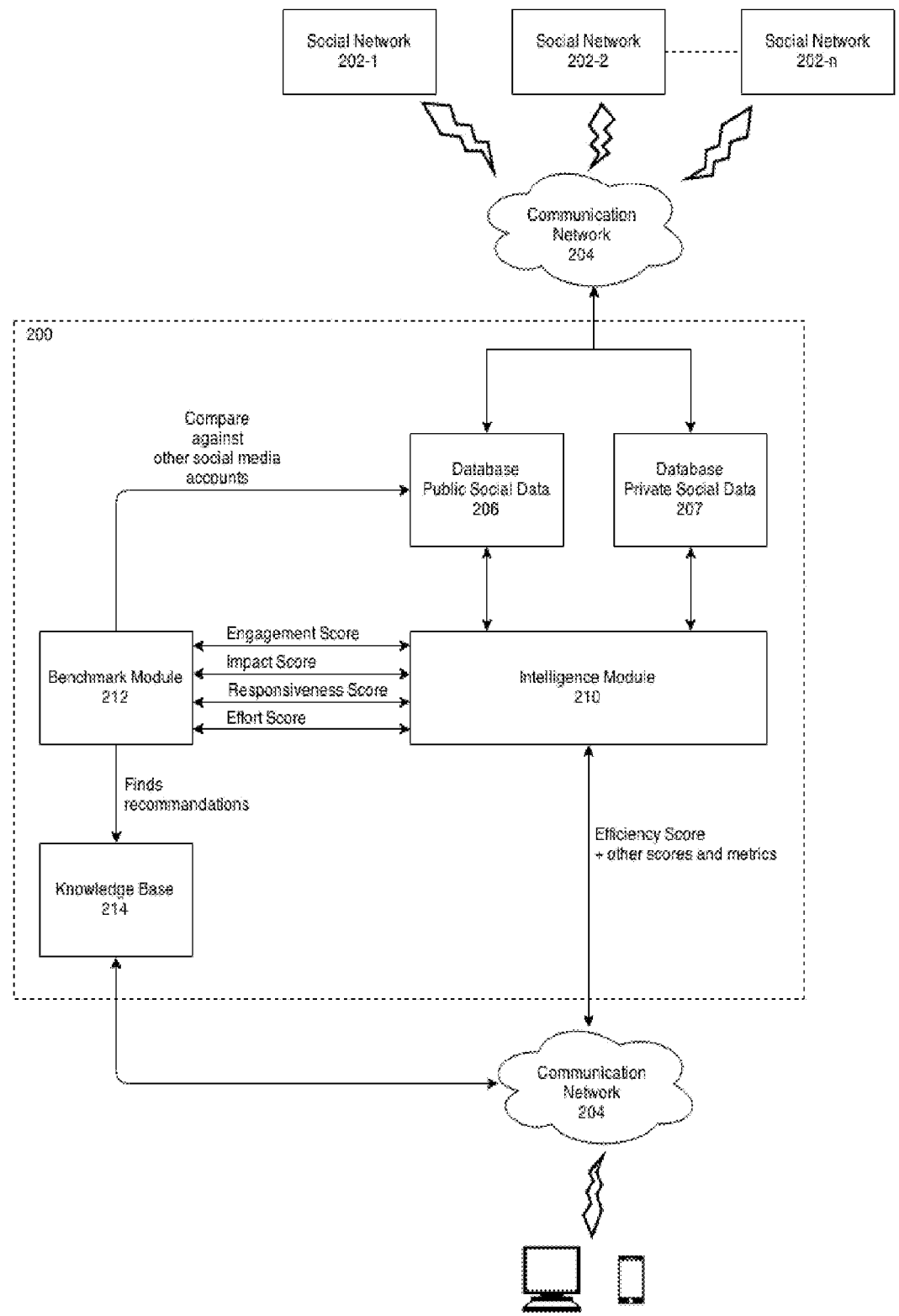
FIG. 6 is a block diagram of an exemplary system for measuring and improving the efficiency of social media campaigns, in accordance with another embodiment.

Private activity data (i.e., activity or metrics that are not public) are collected regularly from the different social networks 202 on clients' social media profiles, usually clients who give access to their profile. This private data collected may be stored in a private data database 207, as shown in FIG. 6. The private activity data comprises data that the manager of a page or campaign has access to, but usually no one else. A typical example of private activity data includes the number of views of content that was posted (e.g., a video). The private activity data is usually provided voluntarily by those who own the data, usually because there is a client relationship.

It is to be noted that the intelligence module 210 may use the database 207 to build correlations between private data in the database 207 and public data in the database 206 using machine learning algorithms. For example, the "reach" is normally a private metric only accessible on client accounts. The module 210 can build mathematical correlations between publicly available metrics of these accounts (such as interaction data) and reach for all the accounts in the database 207. Then apply the formula to the social accounts in the database 206 to estimate reach.

If private activity data of a sufficient number of campaigners is gathered and compared with their own public activity data, correlations can be drawn between the public and private activity data. It means that the private activity data of other campaigners can be estimated based on their public activity data and on the correlations that were determined from the campaigners of which both the public and private activity data were known.

According to an embodiment, the correlations are determined as a coefficient or a set of coefficients applied to metrics determined from public activity data. For example, the exposure (number of views) can be determined as being 10 times the number of likes on a post. In another example, the exposure can be determined as being a linear combination of the number of likes on a post, the number of shares, and the number of fans on the page. According to an embodiment, the correlations are determined by machine learning.

According to an embodiment, the coefficient(s) determined by correlation between public and private activity data can be calculated for specific industries, since some industries can be characterized by higher exposures for a given like rate or fan number.

Based on the coefficient(s), private activity data of a page can be estimated even though only public activity data is available.

For example, various campaigners, e.g., ten different companies having a social media profile, can be identified as belonging to a given industry. For each of these social media profiles, there are public data that can be collected, e.g., the number of fans of each social media profile. If access is given to the private data of these ten different companies, one can know, for example, the number of viewers of a specific post (e.g., 10,000 for the $1^{st}$ company, 12,000 for the $2^{nd}$ company, 20,000 for the $3^{rd}$ company, etc.). One can also know the number of fans (in this example) of each social media profile, which is public data (e.g., 20,000 for the $1^{st}$ company, 23,000 for the $2^{nd}$ company, 42,000 for the $3^{rd}$ company, etc.). By dividing a private data by the public data for a given company (or vice versa), one will get a ratio for each company (e.g., 0.5 for the $1^{st}$ company, 0.5217 for the $2^{nd}$ company, 0.476 for the $3^{rd}$ company, etc.). The mean (or median or other significant value) of this ratio (e.g., 0.51 for all ten companies) can be considered as the average ratio (in this case, viewer/fan ratio) for this industry. Although this ratio may characterize a correlation, the spreading of the values of ratios may be too significant to justify using such industry-averaged ratios. To determine if a correlation exists, one may apply linear regression algorithms on the data. The slope is the mean ratio mentioned above, but the $R^2$ may also be calculated. If the $R^2$ is determined to be close enough to 1, i.e., above some predetermined threshold (e.g., $R^2>0.5$), then it can be determined that a correlation exists and industry-specific ratios such as a viewer/fan ratio can be used. If the ratio such as a viewer/fan ratio is characterized by a $R^2$ value too close to zero, then other ratios can be computed, such as a viewer/likes ratio, or viewer/shares ratio, etc. More generally, a graph of [instance of private data] versus [instance of public data] can be made for various companies identified as belonging to the same industry. This graph is made of a cloud of points. If a linear regression is made on all these ratios, both $R^2$ and slope can be determined. If the $R^2$, or any other indicator of statistical significance, is above some threshold, then the slope can be considered as a significant value; it is the average ratio of [instance of private data]/[instance of public data]. This average ratio, specific to the industry, can be used for other companies for which private data is unknown. One can get the appropriate instance of public data of that company and multiply it by the average industry-specific ratio to have an estimation of the instance of private data for that company.

The system 200 may determine an estimated value of the "reach" for the social campaign depending on the specific social network mechanisms. "Reach" is defined as the number of unique social media users that may have been exposed to the member's published content at least once. For example, on Facebook, reach is defined using the method described above. For example, the number of connections (or "friends" or "relationships") of a given user, or eventually their identity, can be determined. For a given network, users who belong to that network have shared relationships with others; advantageously, this redundancy can be determined to eliminate "duplicate" relationships and avoid overestimating the size of a network (audience) that has been exposed to a given content posted by a user.

The system 200 may determine an individual engagement score for the social campaign based on the number of interactions and the weight associated with each interaction, divided by the estimated value of the reach. The comparison of the resulting value against the values of other social media profiles measured in the benchmark database 212 provides the final engagement score. The individual engagement score represents a degree of engagement/use of the social campaign on a specific social media network.

The system 200 may determine an individual impact score on the social campaign based on the estimated value of the reach. The individual reach estimation is compared against estimated values of the reach of other social media profiles measured in the benchmark database 212 to provide the final impact score.

The system 200 may determine an individual responsiveness score based on the exchanges between activity data from the member's and interaction data from other users. A response rate measurement is defined as all the interaction from other users that the member has replied to versus all the interaction from other users. A response time measurement is defined as all the average elapsed time between the other user's interaction and the member's reply. A response quality measurement is defined by the type of reply from the members and the engagement on the reply. Response rate, time and quality altogether are compared against the ones of the other social media profiles tracked in benchmark database 212 to provide the final responsiveness score.

In an embodiment, the system 200 may determine an effort score for each user with respect to each social network. The effort score is an estimated amount of money spent in developing the social media campaign. For instance, the system may estimate the amount of money by estimating the average time spent in using, developing, updating etc. the social media campaign. The system may take into consideration the frequency of visiting the account (logging in), the number of promoted postings, and the volume of contribution and use of the social media campaign as reflected by
1) sharing links, articles, music, videos, etc.,
2) viewing and liking other people's links and comments,
3) posting new materials,
4) commenting on other people's content etc.
5) Any other actions reflecting engagement, depending on the social network specificities.

The system may then use the engagement score, impact score, responsiveness score, and effort score to determine an efficiency score for the user by applying the user engagement score, impact score and responsiveness score for a certain network against the effort score (e.g., dividing the scores by the estimated amount of money spent in developing the social media campaign), as shown in FIG. 6.

The system may also determine an average efficiency score for all users in the same industry/network. In an embodiment, once the individual efficiency score is determined, it is compared with the average efficiency score of all users in the same industry/network using a benchmark module 212 and presented to the user for viewing. This comparison may notify the user may as to how advanced and efficient they are with respect to other users in their industry and/or network.

Once the individual final efficiency score for each social media network 202 is determined, a global efficiency score (hereinafter "user efficiency score") is calculated which reflects the user's efficiency score on all social networks. In one embodiment, a coefficient may be assigned to each social network based on the popularity and the number of members of the social network. The system 200 may calculate the "user efficiency score" in accordance with equation 1 below:

$$\text{Global Score} = a^*sc1 + b^*sc2 + c^*sc3 + d^*sc4 \quad (1)$$

Where:
a, b, c, and d are the different coefficients associated with the different social networks 202;
a+b+c+d=1; and
sc1 to sc4 are the individual efficiency scores of the user with the different social media networks.

In an embodiment, the system 200 may include a knowledge base 214 for recommending one or more actions to the user to improve their efficiency score by improving their visibility to other users. The knowledge base 214 may be connected to the database 206 to have access to the user's statistical/activity data from each social network 202. The knowledge base may be adapted to obtain the ranking rules of each social network to analyze the statistical data of the user in view of the ranking rules and criterion of each social network 202 to determine the steps that need to be taken to improve the individual efficiency scores of the user with that specific network. The analyzing may include mapping the ranking rules to the activity data (e.g. examining the activity data in light of each rule). In an embodiment, the ranking rules may be examined to determine the most relevant ones. A weight may be assigned to each rule depending on the general relevancy of the rule, or the relevancy of the rule with respect to a specific campaign profile page. The rules may also be re-ordered so that the activity data is analyzed in view of the most relevant rule first to generate recommendations that, when adopted, improve the ranking and/or visibility of the campaign the most.

For example, some social networks penalize the users when they use automated programs for posting contents. Therefore, if the knowledge base 214 detects that some content is being posted automatically (e.g. if multiple postings have occurred at the same time), it may recommend to the user posting contents in their profile manually. In another example, the knowledge base 214 may recommend to post less often if a user has a low amount of comments/likes but a high amount of user posts.

In one example of implementation, the recommendations may be triggered in response to detecting that the efficiency score is lower than a threshold. The threshold may be predetermined, and may also be dependent on the industry score.

In an embodiment, the system 200 updates the activity data in the database 206, and/or the ranking rules in the knowledge base 214 on a regular basis e.g. daily and/or every time a user 208 makes a request, to provide the user 208 with real time (instantaneously) or nearly real time results and recommendations.

For instance, the industry's efficiency score may change depending on the recent activities of other users and the number of users that join or leave the different social networks. Furthermore, the knowledge base's recommendations 214 may also change depending on the latest activities performed by the user and the new rules used by the different social media networks for ranking users. For example, if the knowledge base 214 in the last recommendations suggested that the user completes their profile and the user does before running the last search, the knowledge base 214 would not repeat the same recommendation again. On the other hand, if for example the knowledge base suggested that the user posts the content manually and the ranking rules have changed to stop penalizing users for posting using automated programs, the knowledge base 214 would cease to include the recommendation of posting manually.

As discussed above, the system 200 may be implemented as a server to be accessed remotely by a plurality of clients 208. In an embodiment, measuring and improving the efficiency of social media campaigns is provided as a real time online service (SaaS) in a cloud computing environment, whereby the system 200 remotely connects to both the user 208 and the different social media networks 202 over a communications network 204. An Example of a suitable operating environment for practicing the embodiments is described below.

Figure 4:
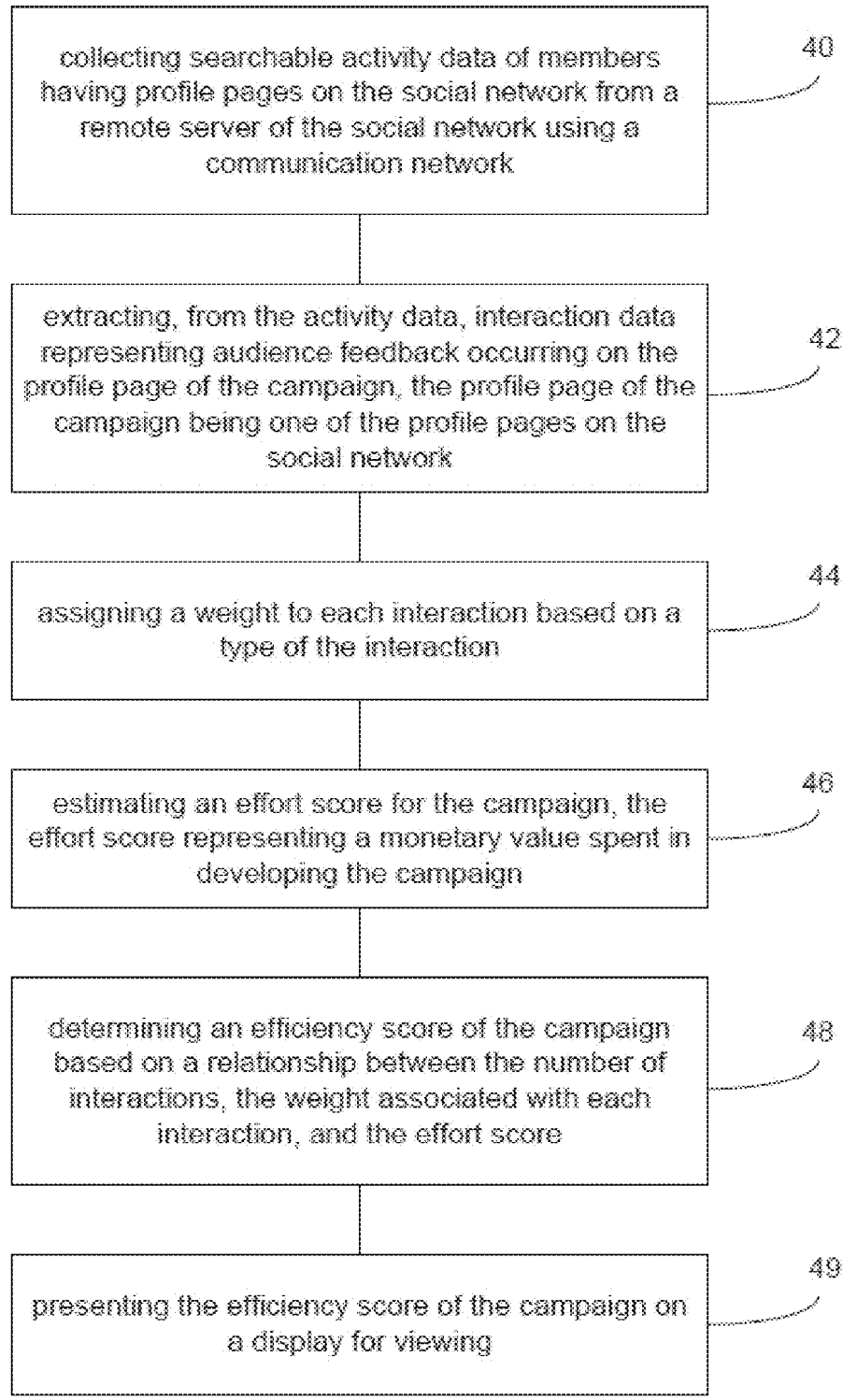
FIG. 4 is a flowchart of a computer-implemented method for measuring an efficiency of a social media campaign (campaign) presented on a profile page on a social network, in accordance with an embodiment.

FIG. 4 is a flowchart of a computer-implemented method for measuring an efficiency of a social media campaign (campaign) presented on a profile page on a social network, in accordance with an embodiment. As shown in FIG. 4, step 50 comprises collecting searchable activity data of members having profile pages on the social network from a remote server of the social network using a communication network. Step 52 comprises extracting, from the activity data, interaction data representing audience feedback occurring on the profile page of the campaign, the profile page of the campaign being one of the profile pages on the social network. Step 54 comprises assigning a weight to each interaction based on a type of the interaction. Step 56 comprises estimating an effort score for the campaign, the effort score representing a monetary value spent in developing the campaign. Step 58 comprises determining an efficiency score of the campaign based on a relationship between the number of interactions, the weight associated with each interaction, and the effort score. Step 59 comprises presenting the efficiency score of the campaign on a display for viewing.

Figure 5:
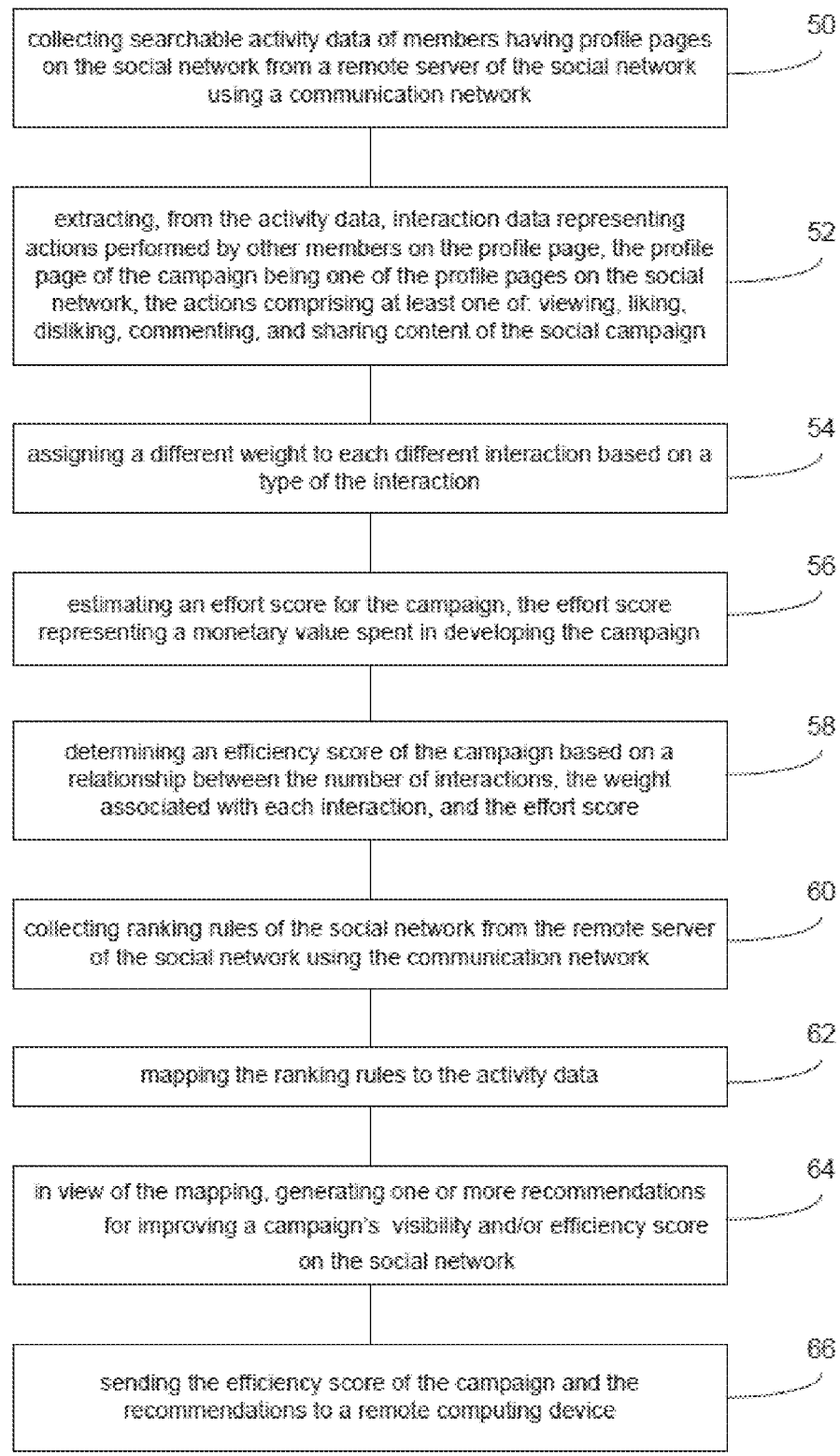
FIG. 5 is a flowchart of a computer-implemented method for measuring an efficiency of a social media campaign (campaign) presented on a profile page on a social network, in accordance with another embodiment.

FIG. 5 is a flowchart of a computer-implemented method for measuring an efficiency of a social media campaign (campaign) presented on a profile page on a social network, in accordance with another embodiment. As shown in FIG. 5, step 50 comprises collecting searchable activity data of members having profile pages on the social network from a remote server of the social network using a communication network. Step 52 comprises extracting, from the activity data, interaction data representing actions performed by other members on the profile page, the profile page of the campaign being one of the profile pages on the social network, the actions comprising at least one of: viewing, liking, disliking, commenting, and sharing content of the social campaign. Step 54 comprises assigning a different weight to each different interaction based on a type of the interaction. Step 56 comprises estimating an effort score for the campaign, the effort score representing a monetary value spent in developing the campaign. Step 58 comprises determining an efficiency score of the campaign based on a relationship between the number of interactions, the weight associated with each interaction, and the effort score. Step 60 comprises collecting ranking rules of the social network from the remote server of the social network using the communication network. Step 62 comprises mapping the ranking rules to the activity data. Step 64 comprises generating, in view of the mapping, one or more recommendations for improving a campaign's visibility and/or efficiency score on the social network. Step 66 comprises sending the efficiency score of the campaign and the recommendations to a remote computing device.

Network and Operating Environment

Figure 2:
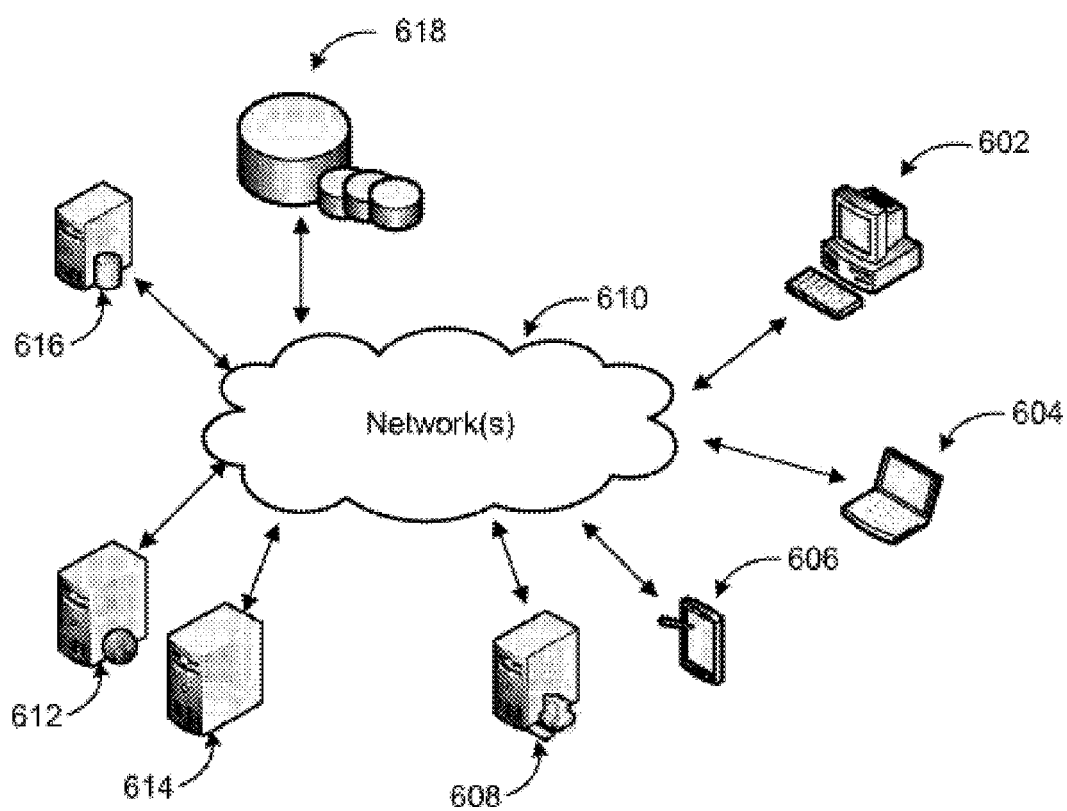
FIG. 2 is an example networked environment, where embodiments may be implemented.

FIG. 2 is an example networked environment, where embodiments may be implemented. Extensible multi-tenant service systems may be implemented in a distributed manner over a number of physical and virtual clients and servers. They may also be implemented in un-clustered systems or clustered systems employing a number of nodes communicating over one or more networks (e.g. network(s) 610).

Such a system may comprise any topology of servers, clients, Internet service providers, and communication media. Also, the system may have a static or dynamic topology. The term "client" may refer to a client application or a client device. While a networked system implementing extensible multi-tenant services may involve many more components, relevant ones are discussed in conjunction with this figure.

Requests for access may come from tenants using individual client devices 602-606 or application server 608 in a networked multi-tenant system. The client device may be one of desktops, laptops, IPADS, IPhones, smart phones, or any computing device having an operating system which can implement the present embodiment.

Such a system may also be implemented, in one or more servers (e.g. servers 612, 614) and accessed by the client devices (or applications). One or more web servers (physical or virtual) such as web server 612 may receive the requests and direct them to the appropriate resource. The resources may include scalable server clusters with synchronous and asynchronous server, organization databases, and other components.

Organization databases may be embodied in a single data store such as data store 618 or distributed over a number of data stores. Dedicated database servers (e.g. database server 616) may be used to coordinate data retrieval and storage in one or more of such data stores.

Network(s) 610 may include a secure network such as an enterprise network, an unsecure network such as a wireless open network, or the Internet. Network(s) 610 provide communication between the nodes described herein. By way of example, and not limitation, network(s) 610 may include wired media such as a wired network or direct-wired connection, and wireless media such as acoustic, RF, infrared and other wireless media.

Many other configurations of computing devices, applications, data sources, data distribution systems may be employed to implement an extensible multi-tenant service platform. Furthermore, the networked environments discussed in FIG. 2 are for illustration purposes only. Embodiments are not limited to the example applications, modules, or processes.

Figure 3:
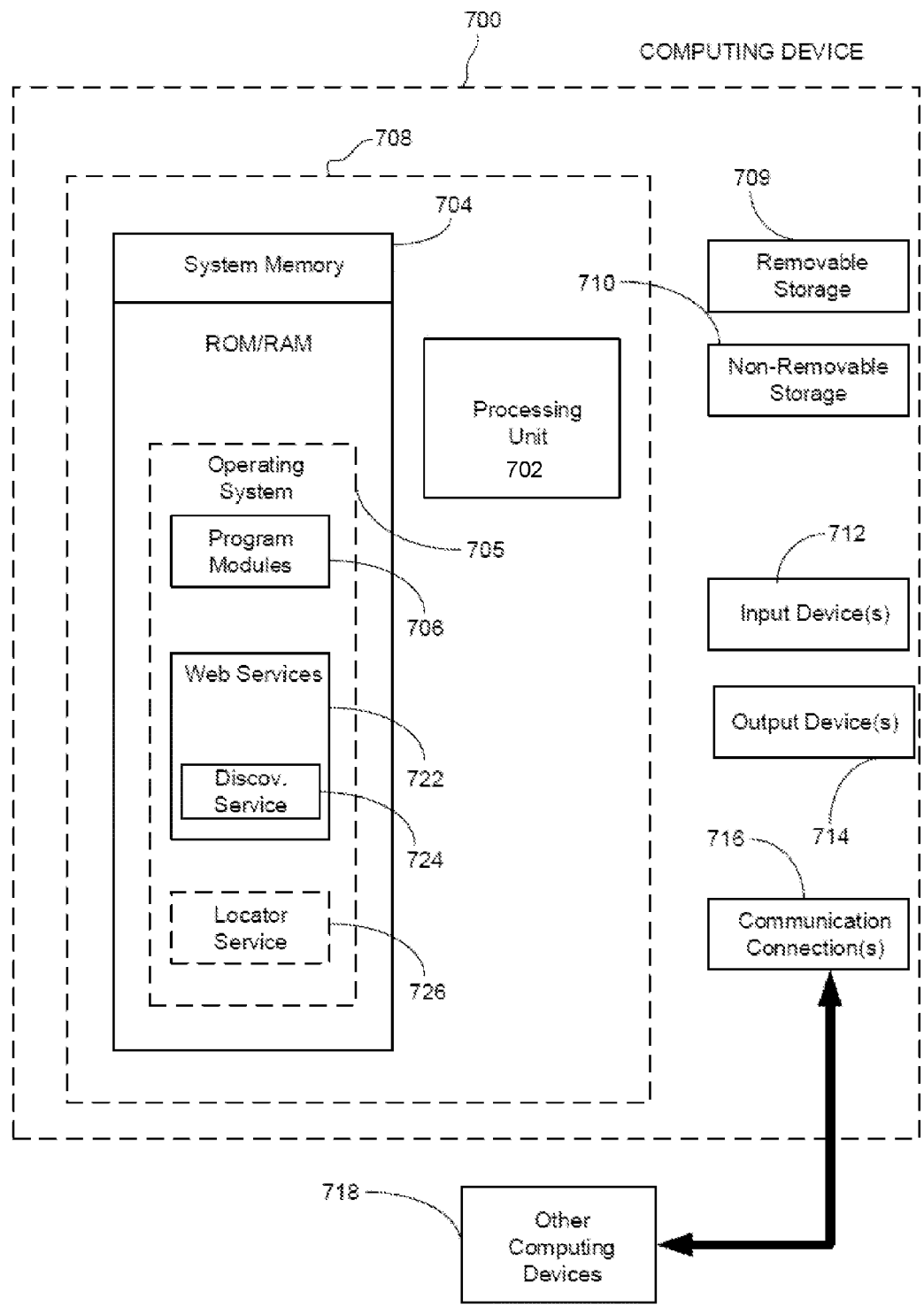
FIG. 3 illustrates a block diagram of an exemplary computing environment.

FIG. 3 and the associated discussion are intended to provide a brief, general description of a suitable computing environment in which embodiments may be implemented. With reference to FIG. 3, a block diagram of an example computing operating environment is illustrated, such as computing device 700. In a basic configuration, the computing device 700 may be a server providing management services associated with an extensible multi-tenant service and typically include at least one processing unit 702 and system memory 704. Computing device 700 may also include a plurality of processing units that cooperate in executing programs. Depending on the exact configuration and type of computing device, the system memory 704 may be volatile (such as RAM), nonvolatile (such as ROM, flash memory, etc.) or some combination of the two. System memory 704 typically includes an operating system 705 suitable for controlling the operation of a networked personal computer, such as the WINDOWS® operating systems from MICROSOFT CORPORATION of Redmond, Wash. The system memory 704 may also include one or more software applications such as program modules 706, Web services 722, a discovery service 724 within web services 722, and an optional locator service 726.

Web services 722 may be a separate application or an integral module of a hosted multi-tenant service platform that provides data and processing services to client applications associated with computing device 700. Discovery service 724 may provide location and configuration information associated with individual organization (tenant) services to a client requesting access to those. Optional locator service 726 may provide services associated with determining a purpose of the service and which databases to use for web servers, as well as asynchronous processing servers, as described previously. This basic configuration is illustrated in FIG. 3 by those components within dashed line 708.

The computing device 700 may have additional features or functionality. For example, the computing device 700 may also include additional data storage devices (removable and/or non-removable) such as, for example, magnetic disks, optical disks, or tape. Such additional storage is illustrated in FIG. 3 by removable storage 709 and non-removable storage 710. Computer storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of device 700. Computing device 700 may also have input device(s) 712 such as keyboard, mouse, pen, voice input device, touch input device, etc. Output device(s) 714 such as a display, speakers, printer, etc. may also be included. These devices are well known in the art and need not be discussed at length here.

The computing device 700 may also contain communication connections 716 that allow the device to communicate with other computing devices 718, such as over a wireless network in a distributed computing environment, for example, an intranet or the Internet. Other computing devices 718 may include server(s) that execute applications associated with a location service or other services. Communication connection 716 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators. These human operators need not be collocated with each other, but each can be only with a machine that performs a portion of the program.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer-implemented method for measuring an efficiency of a social media campaign (campaign) presented on a profile page on a social network, comprising:
   collecting:
      searchable activity data which is publicly available on profile pages associated with members of the social network; and
      private activity data in the social network which is not publicly available from a remote server of the social network using a communication network;
   extracting, from the searchable activity data, interaction data representing audience feedback on the campaign;
   assigning a weight to each interaction based on a type of the interaction;
   calculating an engagement score based on a number of interactions and the weight associated with each interaction;
   correlating the searchable activity data and the private activity data to estimate a value for a number of members of the social network reached by the campaign (reach);
   estimating an amount of money spent in developing the campaign based on the profile page of the campaign;
   determining an efficiency score of the campaign as a ratio between the amount of money and a number indicative of the engagement score and the reach;
   determining, using the searchable activity data of all members, an efficiency score of other campaigns from all members in an industry to which the social media campaign belongs;
   determining an industry efficiency score by averaging the efficiency scores of the other campaigns from all members of the industry; and
   presenting the industry efficiency score concurrently with the campaign efficiency score on a display for viewing,
   wherein upon detecting that the efficiency score of the campaign is below a predetermined threshold:
   collecting ranking rules of the social network from the remote server of the social network using the communication network;
   mapping the ranking rules to the activity data; and
   in view of the mapping, generating one or more recommendations for improving at least one of a visibility and an efficiency score of the campaign on the social network.

2. The method of claim 1 further comprising:
   determining the efficiency score for the campaign on more than one social network;
   assigning a weight to each social network; and
   determining a global efficiency score for the campaign, the global efficiency score representing an overall efficiency of the campaign using the efficiency score and the weight associated with each social network.

3. The method of claim 1 further comprising:
analyzing the searchable activity data and the private activity data in view of the ranking rules; and
in view of the analyzing, generating one or more recommendations for improving at least one of a visibility and an efficiency score of the campaign on the social network.

4. The method of claim 3, wherein the analyzing comprises mapping the ranking rules to the activity data.

5. The method of claim 4, further comprising weighting the ranking rules in view of their relevancy.

6. The method of claim 5, further comprising re-ordering the ranking rules in view of the weight assigned to each rule, whereby the activity data is analyzed in view of the most relevant rule first.

7. The method of claim 1, further comprising determining a responsiveness score based on a fraction of responses from the profile page, an average time elapsed between the responses and a quality of the responses,
wherein determining the efficiency score comprises determining the efficiency score of the campaign as a ratio between the amount of money and a number indicative of the engagement score, the reach and the responsiveness score.

8. The method of claim 1, wherein the interaction data comprises actions performed by other members on the profile page, said actions comprising at least one of: viewing, liking, disliking, commenting, and sharing content of the social media campaign.

9. The method of claim 1, wherein the searchable activity data and the private activity data include any one of: viewing, liking, disliking, commenting, sharing, posting new materials, updating profile, commenting on content outside of the social media campaign profile page.

10. A computer-implemented method for measuring an efficiency of a social media campaign (campaign) presented on a profile page on a social network, comprising:
collecting:
  searchable activity data which is publicly available on profile pages associated with members of the social network; and
  private activity data in the social network which is not publicly available from a remote server of the social network using a communication network;
extracting, from the searchable activity data, interaction data representing actions performed by other members on the profile page, the profile page of the campaign being one of the profile pages on the social network;
assigning a different weight to each different interaction based on a type of the interaction;
determining an engagement score calculated based on a number of interactions and the weight associated with each interaction;
correlating the searchable activity data and the private activity data to estimate a value for a number of members of the social network reached by the campaign (reach);
estimating an effort score for the campaign, the effort score representing a monetary value spent in developing the campaign;
determining an efficiency score of the campaign as a ratio between the amount of money and a number indicative of on the reach;
sending the efficiency score of the campaign to a remote computing device:
collecting ranking rules of the social network from the remote server of the social network using the communication network;
mapping the ranking rules to the searchable activity data and the private activity data;
in view of the mapping, generating one or more recommendations for improving at least one of a visibility and an efficiency score of the campaign on the social network; and
sending the recommendations to the remote computing device.

* * * * *